H. ANDERSON.
NUT SHAVING MACHINE.
APPLICATION FILED JAN. 17, 1918.

1,339,086.

Patented May 4, 1920.

INVENTOR
Homer Anderson

UNITED STATES PATENT OFFICE.

HOMER ANDERSON, OF PEEKSKILL, NEW YORK.

NUT-SHAVING MACHINE.

1,339,086.  Specification of Letters Patent.  Patented May 4, 1920.

Application filed January 17, 1918. Serial No. 212,206.

*To all whom it may concern:*

Be it known that I, HOMER ANDERSON, a citizen of the United States, and resident of Peekskill, in the county of Westchester and State of New York, have invented a Nut-Shaving Machine, of which the following is a specification.

This invention relates to the preparation of nuts for food, and its object is the reduction of nuts to thin slices or shavings, the object being attained by the means set forth in this specification and the accompanying drawings.

Figure 1:
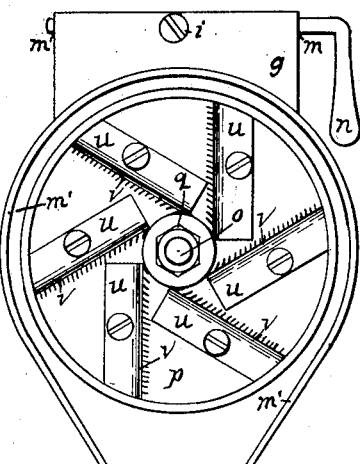
Figure 2:
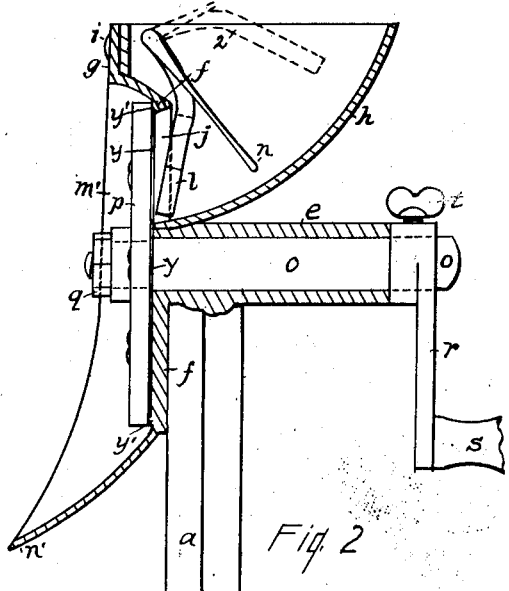
Figure 5:
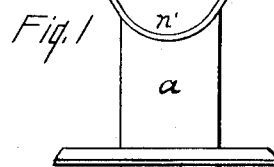
Figure 6:
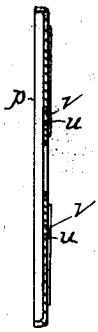
Figure 3:
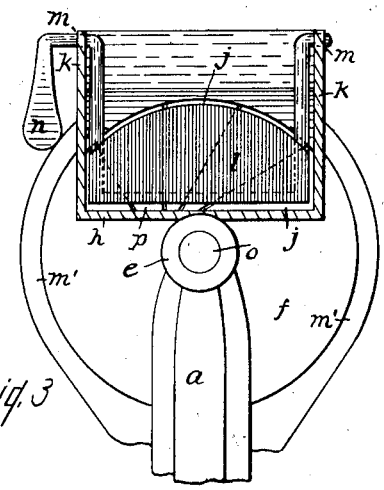
Figure 4:
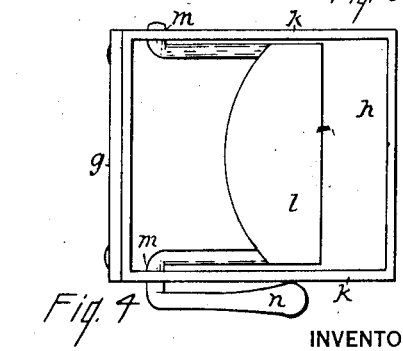

In the drawings Figure 1 is a front elevation of the nut shaver. Fig. 2 is a side elevation of the nut shaver. Fig. 3 shows the upper part of the machine, with the hopper in lateral section. Fig. 4 is a plan of the hopper. Fig. 5 is a detail relating to the shaving knife. Fig. 6 shows in cross section a stamped out cutter disk.

The form of the machine herein shown is for domestic use, adapted to be clamped to a table. Larger machines to be driven by power are made upon practically the same plans except as to the clamping standard.

There is nothing new in the standard $a$ in its clamping devices $b$, $c$ and $d$. The standard ends in a hub $e$, and integral with the standard and the hub is a circular disk $f$. The top of the disk has an upward flange extension $g$. A hopper $h$ is secured to the reverse side of the disk and flange by screws as at $i$, or otherwise.

An opening $j$ is provided in the disk, Figs. 2 and 3, which is the outlet from the hopper. The sides of the hopper are straight, as at $k$ $k$, Figs. 3 and 4, while its bottom is arc-formed, giving an interior space longer than it is deep. Near the front upper corner of the hopper a sweep $l$ is pivoted, as at $m$ $m$ in the sides of the hopper. Outside of the hopper the sweep is provided with a lever handle $n$. Inside of the hopper the sweep moves in an arc eccentric to the bottom of the hopper, as indicated by the broken line position of the sweep shown at 2 Fig. 2.

A shaft $o$ has bearing in the hub $e$, the shaft carrying a disk $p$ fast to the shaft, here shown to be secured by a screw-nut $q$. On the end of the shaft is a crank $r$ and handle $r'$, the crank being secured to the shaft by a thumb-screw $t$. The disk $p$, Fig. 1, is provided with knives $u$ set angularly with respect to the radii of the disk. For each knife a slot $v$ is provided through the disk. In Fig. 5 is a section of the disk $p$, showing the V slot into which the knife projects, the slot and the knife forming a throat like that in a carpenter's plane. It will be observed that the knife edge extends just a trifle beyond the face of the disk, not more in practice than one or two thousandths of an inch, the length of the projection determining the thickness of the nut shaving.

As shown in Fig. 2 the fixed disk $f$ is slightly recessed as at $y$. The rotating disk $p$ is straight on its face, and bears on the edge $y'$ that is formed by the recess $y$. The projections of the knives travel within that recess, and make contact with nothing but what they may be cutting. The edge $y$ prevents particles of nuts working out sidewise between the two disks.

In cutting, the nuts are pressed through the opening $j$ against the rotating disk, and the revolving knives cut off slices from the nuts in passing. Fig. 3 shows a disk adapted for twelve knives and that four of them would be cutting simultaneously. Fig. 1 shows six knives, and with six, two would always be in action.

As the machines are small, enough nuts cannot be put into the hopper to afford weight enough to feed the nuts against the knives hence, the sweep $l$. By means of the handle $n$ the nuts are pushed forward by the sweep, and when the sweep has gone to its limit toward the knives, raising the sweep allows the nuts to fall below it, and in this manner the nuts are fed against the knives. That is why the sweep is made to move eccentric with the bottom of the hopper. Otherwise the raising of the sweep would throw the nuts out of the hopper. In the construction shown the nuts fall freely on each side of the sweep. One hand of the operator can keep the crank turning and the other hand can keep the hopper supplied and the sweep in motion. The cutting by the machine is both easy and rapid.

The rotating disk can be made in one piece, by punching from a plate of steel and setting out the cutting edges in a die, as indicated in Fig. 6.

As the rotation of the disk $p$ tends to throw the nut shavings sidewise from the machine, a guard $m'$, Figs. 1, and 2 and 3, is provided, shown to be integral with the disk $f$, though not necessarily so, that surrounds the rotating disk and terminates in a spout n'. When needful to clean the machine, removing the crank r permits the withdrawal of the shaft and disk p, when the various parts of the machine are all accessible.

Every kind of nut can be handled in this machine, and it puts nuts in a form for food that has not heretofore been accomplished.

Having described my invention, what I claim and desire to secure by Letters Patent, is—

1. In a nut shaving machine the combination with the shaving devices of a feeding hopper, a bottom to the hopper curving from the top to its junction with the body of the machine, a sweep hinged within the forward top of the hopper, the end of the sweep moving in a circle eccentric to the bottom of the hopper, and a sweep operating handle outside of the hopper.

2. In a machine for shaving nuts, a frame embodying a shaft bearing, a circular disk concentric with the bearing, a shallow rim projecting from the outer face edge of the disk, a shaft in the bearing, a cutter disk fast to one end of the shaft, a removable crank attached to the other end of the shaft, the rotating disk having its outer face edge bearing against the rim on the fixed disk forming a recess between the two disks, a feeding hopper attached to the fixed disk, and an open apron flange integral with the fixed disk and projecting beyond the rotating disk forming a spout terminal at the bottom.

Signed at Peekskill, in the county of Westchester and State of New York, this 14" day of January, 1918.

HOMER ANDERSON.

Witnesses:
  DOUGLAS DE F. ANDERSON,
  WILLIAM F. CHASE.